United States Patent
Yu

(10) Patent No.: US 6,544,027 B2
(45) Date of Patent: Apr. 8, 2003

(54) MANIFOLD OF INJECTION MOLDING MACHINE

(75) Inventor: Young-Hee Yu, Seoul (KR)

(73) Assignee: Yudo Co., Ltd., Kyounggi-do (KR)

(*) Notice: Subject to any disclaimer, the term of this patent is extended or adjusted under 35 U.S.C. 154(b) by 0 days.

(21) Appl. No.: 09/922,925

(22) Filed: Aug. 7, 2001

(65) Prior Publication Data

US 2002/0054934 A1 May 9, 2002

(30) Foreign Application Priority Data

Aug. 7, 2000 (KR) .................................... 2000-0045561

(51) Int. Cl.[7] .............................................. B29C 45/22
(52) U.S. Cl. ................. 425/570; 264/297.1; 264/328.8; 425/572
(58) Field of Search .................. 425/572, 570; 264/297.1, 328.8

(56) References Cited

U.S. PATENT DOCUMENTS 5,032,078 A * 7/1991 Benenati ..................... 425/572
6,050,806 A    4/2000 Ko
6,086,356 A    7/2000 Yu

* cited by examiner

*Primary Examiner*—Tim Heitbrink
(74) *Attorney, Agent, or Firm*—McDermott, Will & Emery

(57) ABSTRACT

Disclosed is a manifold of an injection molding machine. The manifold of the present invention has a groove formed on a top surface of the manifold, into which a heating wire is inserted. Protrusions are formed on both sides of an upper end of the groove and are projected from the top surface of the manifold. The protrusions fix the heating wire in such a manner that the heating wire is inserted into the groove and then the protrusions are press-fitted into the inside of the groove by way of a press or a hammer.

3 Claims, 1 Drawing Sheet

[Fig. 1] PRIOR ART
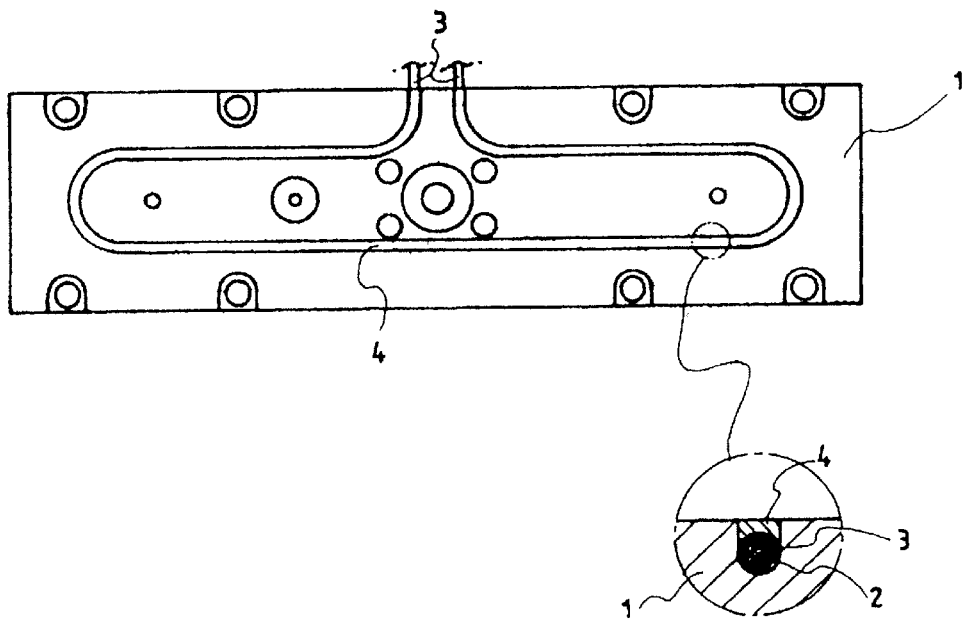
[Fig. 2]
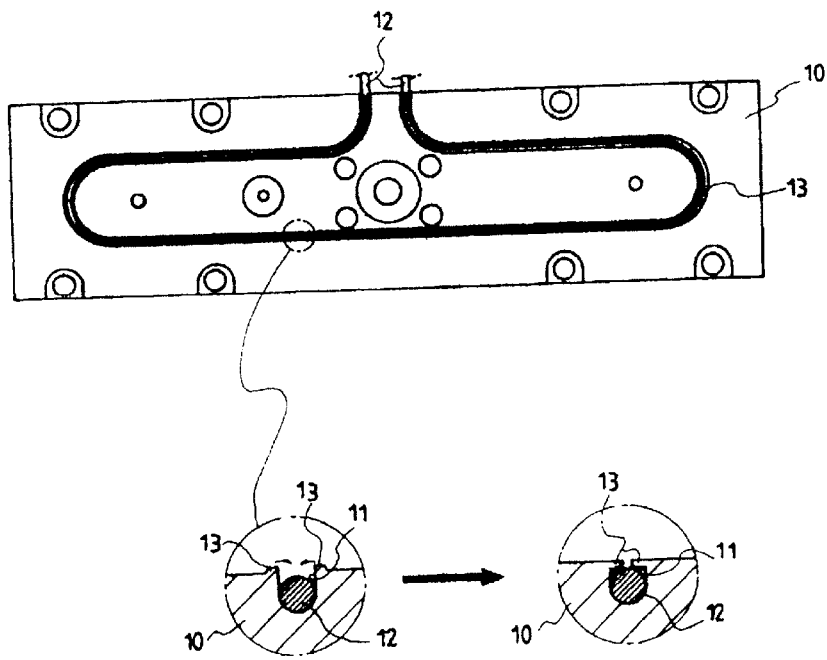

MANIFOLD OF INJECTION MOLDING MACHINE

BACKGROUND OF THE INVENTION

1. Field of the Invention

The present invention relates to a manifold of an injection molding machine, and more particularly to a structural improvement of such a manifold in that a heating wire provided in the manifold can be easily and simply fixed on a surface of the manifold, the heating wire being used for heating a molten plastic material to prevent the molten plastic material from being solidified when the plastic material is injected from an injection cylinder into a cavity of a mold through the manifold and its injection nozzles.

2. Description of the Prior Art

In a general injection molding machine producing plastic products, a plastic raw material is introduced into and melted in an injection cylinder provided on one side of the injection molding machine, and the molten plastic material is injected into a mold. In order to smoothly and uniformly inject the molten plastic material into a cavity formed in a bottom mold, a manifold is formed in a top mold while a plurality of injection nozzles being provided at the bottom of the manifold for injecting the molten plastic material into the cavity of the bottom mold. During an injection molding process, the molten plastic material under high pressure is filled into the cavity of the mold. When the plastic material within the cavity is solidified, the top and bottom molds are separated from each other so as to remove the plastic product from the cavity.

In order to prevent the molten plastic material from being undesirably solidified in the course of its flowing from the injection cylinder into the cavity of the bottom mold, a heating wire is arranged around both the manifold and the injection nozzles. That is, the heating wire passes through a hole within the manifold to heat the manifold and so to prevent the molten plastic material from being undesirably solidified within the manifold. The heating wire is also wound around the injection nozzles to heat the nozzles. It is thus possible for the molten plastic material not to be solidified within the manifold or the injection nozzles before the molten plastic material is injected into the cavity of the bottom mold during the injection molding process.

The heating wire, however, cannot be arranged in a curved form, but is arranged in the only linear form, that is, in either a transverse or a longitudinal direction, so that there is a disadvantage in that the heating wire is incapable of delivering heat at the same thermal efficiency to plastic material injection holes arranged in the curved form. Since the heating wire cannot but be arranged in only a linear form, the whole manifold cannot be evenly heated unless a plurality of heating wire insertion holes are formed in several places of the manifold. Nevertheless, it is impossible to form the heating wire insertion holes in several places in view of the structure of the manifold, which results in using the heating wire having high thermal capacity to compensate for the inefficient function of preventing the solidification of the molten plastic material. As the result of this, there is a drawback in that the heating wire of high thermal capacity incurs a high cost.

To solve the above-mentioned problems, therefore, the present applicant has devised a prior invention, which is now allowed as Korean Patent No. 113803. In the prior invention, as shown in FIG. 1, there is formed on each of top and bottom surfaces of a manifold 1 a groove 2 into which a heating wire 3 is inserted and whose upper end is closed by a finishing material 4 made of copper having excellent thermal conductivity. Such a prior invention is being widely used because it has advantages in that the heating wire 3 can be arranged along plastic material injection holes formed within the manifold 1 to evenly transmit heat to the plastic material injection holes and thus to reliably prevent the solidification of the molten plastic material, and in that it is simpler in its installation than the forming of the heating wire insertion holes and inserting the heating wire into the holes, thereby enhancing the productivity of the manifold.

In spite of these advantages of the prior invention, however, the finishing material 4 must be so formed as to match the shape of the groove 2 and then inserted into the groove 2 by means of a pressing apparatus such as a press or a hammer, thereby complicating the manufacturing work of the manifold and raising the manufacturing cost. Also, since the finishing material 4 and the manifold 1 are different from each other in thermal characteristics such as thermal expansion and the like due to their different metal compositions, there is a problem in that the finishing material 4 is broken out of its position and thus the heating wire 3 is not fixed when the manifold 1 is used for a long time in the heated state of the heating wire 3.

SUMMARY OF THE INVENTION

Accordingly, the present invention has been made to overcome the above-mentioned problems, and it is an object of the present invention to provide a manifold of an injection molding machine, in which means for fixing a heating wire provided in the manifold of the injection molding machine is formed integrally with the manifold while being capable of easily and simply fixing the heating wire, thereby providing manufacturing convenience and economic benefit, and preventing the fixing means from failing due to the heat of the heating wire during its use.

To accomplish this object, there is provided a manifold of an injection molding machine in accordance with the present invention, the manifold comprising: a groove formed on a top surface of the manifold for inserting a heating wire thereinto while protrusions being formed on both sides of an upper end of the groove and projected from the top surface of the manifold, wherein the protrusions fix the heating wire in such a manner that the heating wire is inserted into the groove and then the protrusions are press-fitted into the inside of the groove by pressing means such as a press or a hammer.

BRIEF DESCRIPTION OF THE DRAWINGS

The above and other objects, features and other advantages of the present invention will be more apparent from the following detailed description taken in conjunction with the accompanying drawings, in which:

FIG. 1 is a schematic view showing a construction of a conventional manifold; and FIG. 2 is a schematic view showing a construction of a manifold in accordance with the present invention.

DETAILED DESCRIPTION OF THE PREFERRED EMBODIMENTS

Hereinafter, a preferred embodiment of the present invention will be described with reference to the accompanying drawings. In the following description and all drawings, the same reference numerals are used to designate the same or similar components, and so repetition of the description of the same or similar components will be omitted.

FIG. 2 is a schematic view showing a construction of a manifold of an injection molding machine in accordance with the present invention.

As shown in the drawing, means for disposing a heating wire 12 in the manifold 10 of the injection molding machine according to the present invention comprises a groove 11 formed on a top surface of the manifold 10, in which a heating wire 12 is inserted, and protrusions 13 formed on both sides of an upper end of the groove 11 and projected from the top surface of the manifold 10. The protrusions 13 fix the heating wire 12 in such a manner that the heating wire 12 is inserted into the groove 11 and then the protrusions 13 are press-fitted into the inside of the groove 12 by pressing means such as a press or a hammer.

As seen from FIG. 2, the groove 12 is formed in a shape allowing even heating of all parts of the manifold 10, and particularly allowing sufficient heat delivery to plastic material injection holes through which a molten plastic material passes from an injection cylinder to injection nozzles.

The operations of the so constructed manifold of the present invention are as follows:

The groove 11 is formed on the upper surface of the manifold 10 along the plastic material injection holes (not shown) provided within the manifold 10 with the protrusions 13 being formed around the groove 12 and projected at a predetermined height from the upper surface of the manifold 10. After the heating wire 12 is inserted into the groove 11, the protrusions 13 formed on both sides of the upper end of the groove 12 are bent toward the inside of the groove 12 by pressing means such as a press or a hammer.

If the protrusions 13 formed around the groove 11 are thus bent toward the inside of the groove 12, inner surfaces of the protrusions 13 come in contact with the heating wire 12 having been inserted into the groove 11 to fix the heating wire 12 within the groove 11.

When the heating wire 12 is so provided in the manifold 10, the injection nozzles are combined with the manifold 10 to form a top mold, and the top mold is coupled with a bottom mold. Thereafter, the molten plastic material within the injection cylinder is injected into a cavity of the bottom mold through the manifold 10 and the injection nozzles, and when the plastic material within the cavity is solidified, the top and bottom molds are separated from each other to obtain the plastic product molded within the cavity.

Although the molten plastic material within the injection cylinder is injected through the manifold 10 and the injection nozzles into the cavity of the bottom mold so as to obtain the plastic product as stated above, there is a fear of solidification of the molten plastic material in the course of its injection, that is, in the course of its passing through the manifold 10 and the injection nozzles. By applying power to the heating wire 12 to generate heat from the heating wire 12, however, the molten plastic material is injected into the cavity of the bottom mold without solidification.

In other words, if the heating wire 12 generates heat, the heat from the heating wire 12 is delivered to the manifold 10 to heat the manifold 10, and particularly much more heat is delivered to the passage portions of the manifold to heat the molten plastic material passing the passage portions. At this time, the heat heating the molten plastic material is only sufficient to prevent the molten plastic material having its own heat from being cooled down and solidified, that is, to maintain the heat contained in the molten phase plastic material, so that high thermal efficiency can be realized by a small quantity of heat. Besides, the installation work is so simple as to enhance the workability, and it is possible to prevent the problems due to the different thermal characteristics between the manifold and the heating wire-fixing means.

As described above, the present invention provides a manifold of an injection molding machine, which has a groove for inserting a heating wire thereinto and protrusions formed on both sides of an upper end of the groove. The so constructed manifold of the present invention allows the installation work to be easy and simple, thus providing advantages of not only simplifying the installation work, but also reducing the cost. Also, since the protrusions fixing the heating wire are integrated with the manifold, there is no fear of the deformation or the dislocation of the protrusions causing the non-fixing of the heating wire even when the circumference of the heating wire is always in the heated state.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A manifold of an injection molding machine comprising:
a groove formed on a top surface of the manifold for inserting a heating wire there into with protrusions being formed on both sides of an upper end of the groove and projected from the top surface of the manifold, wherein the protrusions fix the heating wire in such a manner that the heating wire is inserted into the groove and then the protrusions are press-fitted into the inside of the groove by pressing means.

2. A manifold of an injection molding machine according to claim 1, wherein the pressing means is a press.

3. A manifold of an injection molding machine according to claim 1, wherein the pressing means is a hammer.

* * * * *